US010180554B2

(12) United States Patent
Marcou et al.

(10) Patent No.: US 10,180,554 B2
(45) Date of Patent: Jan. 15, 2019

(54) TRACK FOR ROUTING AN OPTICAL FIBER

(71) Applicant: Tii Technologies Inc., Edgewood, NY (US)

(72) Inventors: Jean-Claude Marcou, Limoges (FR); Vincent Barbo, Greenlawn, NY (US); David E. Foley, Manhattan Beach, CA (US); Walter Fay, Smithtown, NY (US); Alex Clifton Feezer, Freeland, MD (US); Parag Mehta, Mill Neck, NY (US)

(73) Assignee: Tii Technologies Inc., Edgewood, NY (US)

(\*) Notice: Subject to any disclaimer, the term of this patent is extended or adjusted under 35 U.S.C. 154(b) by 0 days.

(21) Appl. No.: 15/598,561

(22) Filed: May 18, 2017

(65) Prior Publication Data

US 2017/0336589 A1    Nov. 23, 2017

Related U.S. Application Data

(60) Provisional application No. 62/338,819, filed on May 19, 2016.

(51) Int. Cl.
*G02B 6/44* (2006.01)
*G02B 6/36* (2006.01)

(52) U.S. Cl.
CPC ......... *G02B 6/4459* (2013.01); *G02B 6/364* (2013.01); *G02B 6/4466* (2013.01); *G02B 6/4471* (2013.01)

(58) Field of Classification Search
None
See application file for complete search history.

(56) References Cited

U.S. PATENT DOCUMENTS

| | | | | |
|---|---|---|---|---|
| 3,576,304 A | \* | 4/1971 | Gillemot | F16L 3/1226 24/306 |
| 3,894,706 A | \* | 7/1975 | Mizusawa | F16L 3/1025 248/68.1 |
| 4,099,346 A | \* | 7/1978 | Isono | E04B 7/163 160/236 |

(Continued)

FOREIGN PATENT DOCUMENTS

| | | | |
|---|---|---|---|
| EP | 1750047 A1 | \* | 2/2007 |
| GB | 2169152 A | \* | 7/1986 |
| WO | WO 2010/009067 A2 | \* | 1/2010 |

OTHER PUBLICATIONS

3M Company, "3M(tm) Clear Track Fiber Pathway Installation Instructions", dated 2016. Retrieved from https://multimedia.3m.com/mws/media/1188661O/3m-clear-track-fiber-pathway-installation-instructions.pdf.\*

(Continued)

*Primary Examiner* — Mike Stahl
(74) *Attorney, Agent, or Firm* — Bodner & O'Rourke, LLP; Gerald T. Bodner; Christian P. Bodner

(57) ABSTRACT

A track system for routing an optical fiber includes a track for selectively retaining the optical fiber therein, a cover piece which is mounted to the track, and a corner piece which is mounted to the track. The track is formed as an elongated member and includes a pair of legs that are spaced apart from each other to define a slot and an internal channel into which the optical fiber is received. The cover piece is mountable to the track to help retain the optical fiber in the track.

12 Claims, 6 Drawing Sheets

(56) References Cited

U.S. PATENT DOCUMENTS

| | | | | |
|---|---|---|---|---|
| 5,123,813 | A * | 6/1992 | Przytulski | F01D 5/26 403/372 |
| 5,243,731 | A * | 9/1993 | Yang | B60S 1/38 15/250.19 |
| 5,917,982 | A * | 6/1999 | Vargas | G02B 6/4459 385/134 |
| 6,323,421 | B1 * | 11/2001 | Pawson | H02G 3/0418 174/503 |
| 6,344,611 | B2 * | 2/2002 | Ewer | H02G 3/0608 174/488 |
| 7,394,963 | B2 * | 7/2008 | Hartlef | G02B 6/4471 385/134 |
| 8,779,290 | B1 * | 7/2014 | DePaul | H02G 3/0431 174/68.3 |
| 2003/0063888 | A1 * | 4/2003 | Sahlin | G02B 6/0005 385/134 |
| 2010/0147579 | A1 * | 6/2010 | Kaplan | H02G 3/0431 174/481 |
| 2010/0243096 | A1 * | 9/2010 | Berglund | G02B 6/4459 138/107 |
| 2011/0030190 | A1 * | 2/2011 | Larson | G02B 6/4441 29/428 |
| 2012/0006947 | A1 * | 1/2012 | Gundel | F16L 3/223 248/68.1 |
| 2012/0281958 | A1 * | 11/2012 | Petersen | G02B 6/4471 385/135 |
| 2013/0294734 | A1 * | 11/2013 | Takeuchi | G02B 6/4401 385/100 |
| 2015/0331217 | A1 * | 11/2015 | Kaplan | G02B 6/4459 385/135 |
| 2017/0297230 | A1 * | 10/2017 | Sorimoto | B29C 33/44 |

OTHER PUBLICATIONS

3M Company, "3M Previews New FTTH Solutions to Clean Up Fiber Drop Cable Deployment", dated Jun. 29, 2015. Retrieved from http://www.kgplogistics.com/pdf_4_web/3m-ftth-news-release-62915.pdf.*

* cited by examiner

TRACK FOR ROUTING AN OPTICAL FIBER

CROSS-REFERENCE TO RELATED APPLICATIONS

This application is related to U.S. Provisional Patent Application Serial No. 62/338,819, filed on May 19, 2016, and entitled "Track for Routing an Optical Fiber", the disclosure of which is hereby incorporated by reference and on which priority is hereby claimed.

BACKGROUND OF THE INVENTION

Field of the Invention

The present invention generally relates to fiber optic communications systems, and more particularly relates to devices and techniques for routing optical fibers and cables within residential or commercial premises.

Description of the Prior Art

Oftentimes, a technician of an internet/cable television service provider needs to install fiber optic cables within the premises of an end-user, such as a residential house, apartment or commercial office building. In doing so, sometimes it is necessary to route a single optical fiber strand within the premises on the surface of the interior walls of the premises, and around corners, door trims or window frames. What is done conventionally by a technician to secure a length of bare optical fiber is to use caulking applied over the optical fiber, or an adhesive, or a tape covering. Such measures for securing the optical fiber are quite unsightly. Adhesives and caulking are often unevenly applied and provide little protection, if any, to the optical fiber. A tape covering is also unsightly, may exhibit wrinkles when applied, and the edges of the tape may lift as it ages. Tape also provides very little protection for the optical fiber, and may be difficult to remove or reposition without damaging the sensitive optical fiber it covers. Also, none of the above-described methods provides for the required minimum bend radius when routing the optical fiber around corners or edges of walls, doors and windows.

OBJECTS AND SUMMARY OF THE INVENTION

It is an object of the present invention to provide a track for routing an optical fiber in residential or commercial premises.

It is another object of the present invention to provide a track system for routing an optical fiber that allows the fiber to be secured to an interior (or exterior) wall of the premises, and around corners, door trims and window frames.

It is still another object of the present invention to provide a track for routing an optical fiber that provides protection for the fiber from damage.

It is a further object of the present invention to provide a track for routing an optical fiber that is aesthetically pleasing and will not detract from the appearance of the room or office, or other space, of the premises within which it is mounted.

It is yet a further object of the present invention to provide a track for routing an optical fiber which facilitates the installation of the track in the premises and the insertion of an optical fiber within the track by a technician or an end-user.

It is still another object of the present invention to provide a track system or fiber raceway for routing an optical fiber within a residential or commercial premises and which guides the optical fiber around right angle corners of walls, doors and windows at or above the minimum bend radius for optical fibers.

In one form of the present invention, a track for routing an optical fiber is formed as an elongated member having a back wall on which an adhesive is applied, and an opposite front wall in which is formed a slot for receiving an optical fiber. The slot is dimensioned and configured for the easy insertion of the optical fiber and for holding the optical fiber in place within the track, but also allow the optical fiber to be removed from the track without damage to the optical fiber.

In the preferred embodiment, the track is flexible and preferably made from a soft polyvinylchloride, soft polyethylene, or similar material, and is bendable around corners. Alternatively, straight sections of the track may be made from more rigid materials as desired for the specific application. The track, with its adhesive backing, may be affixed to the interior walls of a residential or commercial premises and routed on the wall along a baseboard or ceiling trim, a door trim or a window frame. The track is installed with its slotted front wall facing outwardly and exposed and then, preferably, the optical fiber is inserted into the slot on the front wall of the track and retained therein.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
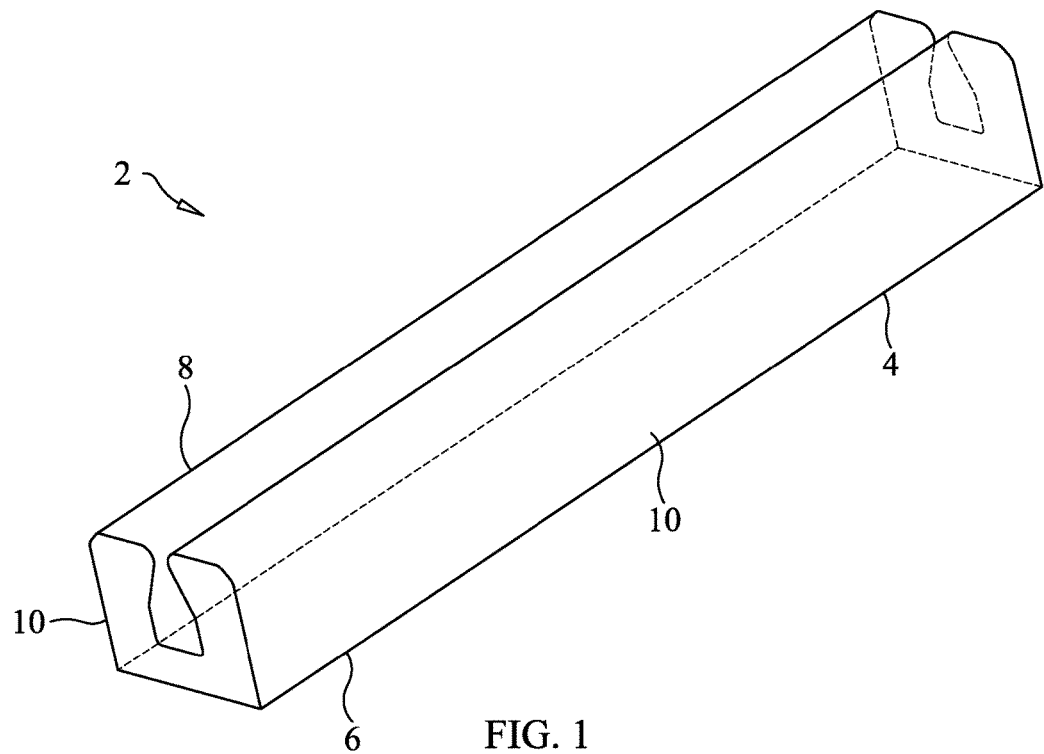
FIG. 1 is an isometric view of a section of a track for routing an optical fiber formed in accordance with the present invention.

Initially referring to FIGS. 1-4 of the drawings, it will be seen that a track 2 for routing an optical fiber within a residential or commercial premises includes an elongated member 4, which is generally rectangular in transverse cross-section, having a back wall 6, a front wall 8 situated opposite the back wall 6, and opposite lateral side walls 10. The back wall 6 includes an adhesive layer 9 that is covered by a removable plastic backing 11. The plastic backing 11 may be removed by a technician or end-user to expose the adhesive layer 9 on the back wall 6 of the track 2 (i.e., the elongated member 4) when the technician or end-user is about to apply the track 2 to an exposed surface of an interior wall of the residential or commercial premises. The track 2, and more precisely, the elongated member 4, is preferably made from a soft polyvinylchloride material or from a soft polyethylene material, and is preferably clear so that the color of the wall on which it is mounted shows through the track 2 and, accordingly, the track 2 blends in with the wall and does not appear obtrusive.

The opposite front wall 8 of the elongated member 4 has an opening along the longitudinal length thereof to define a slot 12 for receiving therethrough a bare optical fiber, that is, one with the jacket previously removed. More specifically, the slot 12 is formed with a dovetail entryway 14 which leads to a preferably enlarged rectangular (in cross-section) inner cavity 16 in which the optical fiber will reside. Because of the slot 12, the opposite lateral side walls 10 of the track 2 are resilient to some degree such that they will spread apart when the optical fiber is inserted into the slot 12 on the front wall 8 of the track 2, and converge when the optical fiber is residing within the inner cavity 16 of the slot 12. The opposite interior edges 18 of the front wall 8 of the track 2 which define the slot 12 are preferably rounded to facilitate the insertion of the optical fiber into the slot 12.

The dimensions of the track 2, and in particular the slot 12 formed therein, allow for the easy insertion of the optical fiber into the track 2 and for holding the optical fiber captive within the inner cavity 16 of the slot 12 but also allow the optical fiber to be removed from the track 2 without damage to the optical fiber. A bare optical fiber, with the jacket thereof removed, is typically about 900 microns in diameter. 900 microns is equivalent to 0.900 millimeters. Other diameters of bare optical fibers are supported by adjusting the dimensions described below.

Accordingly, preferably the narrowest part of the slot 12 at the open end of the dovetail entry 14 thereof is about 0.40 millimeters. The rectangular inner cavity 16 in which the optical fiber resides is about 1.30 millimeters in width and about 0.87 millimeters in height. The dovetail entryway 14 of the slot 12 is situated between the rectangular inner cavity 16 and the open end of the slot 12 situated at the surface of the front wall 8 of the track 2. Also, preferably, the rounded edges 18 of the front wall 8 at the slot entryway 14 are formed with a radius of about 0.30 millimeters.

The track 2 is formed with overall dimensions that are relatively small so as not to be obtrusive when adhered to the surface of an interior wall or trim of the premises. The overall width of the track 2 is preferably about 4.00 millimeters, and the depth of the track 2 is preferably about 3.00 millimeters. The depth of the slot 12, measured from the surface of the front wall 8 of the track 2, is preferably about 2.30 millimeters.

Figure 3:
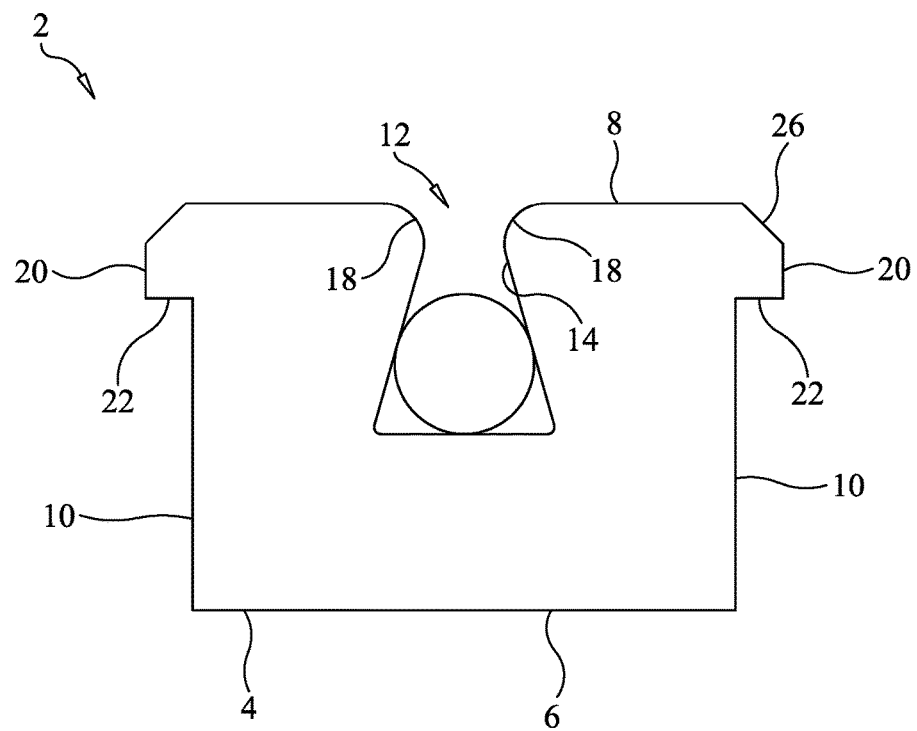
FIG. 3 is another transverse, cross-sectional view of a second embodiment of a track for routing an optical fiber and formed in accordance with the present invention.
Figure 4:
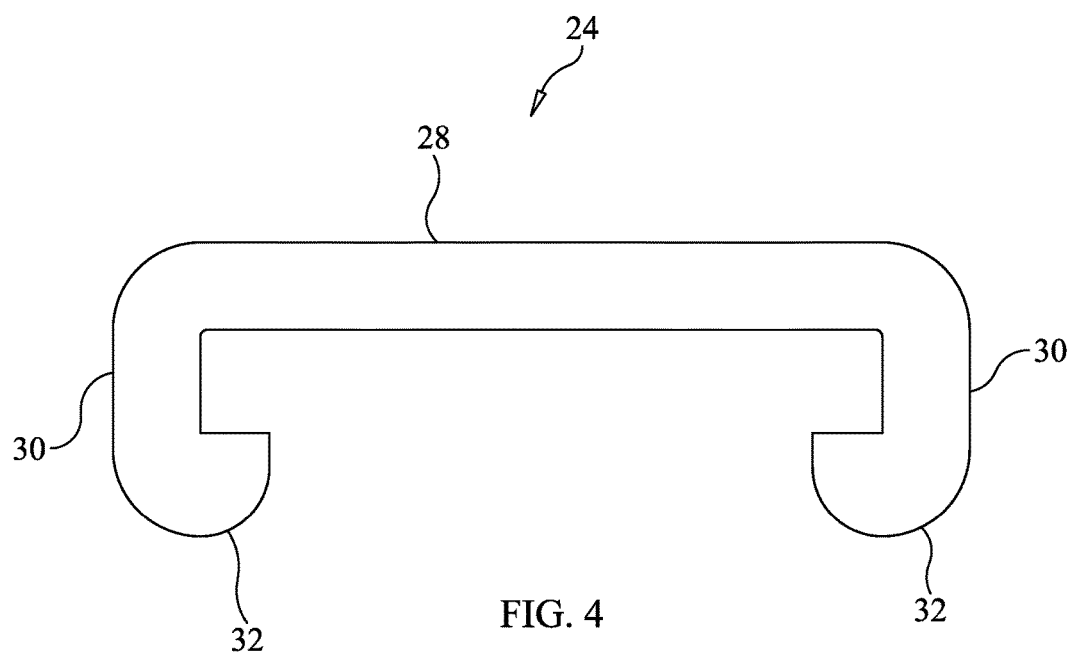
FIG. 4 is a transverse, cross-sectional view of a cover piece forming part of the present invention for mounting on the track shown in FIG. 3 of the drawings.

Another version of the track 2 of the present invention is shown in FIGS. 3 and 4 of the drawings. In this embodiment, the track 2 is also formed as an elongated member 4, which like the first embodiment is also generally rectangular in transverse cross-section, having a back wall 6, an opposite front wall 8, and opposite lateral side walls 10. The front wall 8 is also slit along the longitudinal length of the track 2 so as to form a slot 12, also with rounded edges 18 at the entryway to the slot 12 at the surface of the front wall 8 of the track 2. In this embodiment, the slot 12 is formed with a dovetail shape in transverse cross-section, its widest point being preferably about 1.30 millimeters, the slot 12 having a depth, measured from the surface of the front wall 8 of the track 2, of preferably about 1.00 millimeters. The radius of the curved edges 18 of the front wall 8 of the track 2 that define the entryway to the slot 12 is preferably about 0.30 millimeters. Again, the preferred width of the track 2, measured transversely at the back wall 6 thereof, is preferably about 4.00 millimeters, and the overall depth of the track 2 of this particular embodiment is about 3.00 millimeters.

In the embodiment of the track 2 of the present invention shown in FIGS. 3 and 4 of the drawings, it can be seen that the front wall 8 includes opposite shoulders 20 which overhang in opposite directions the lateral side walls 10 of the track 2, preferably by about 0.35 millimeters. Each shoulder 20 defines a lip 22 for securing over the front wall 8 of the track 2 an elongated cover piece 24, or cap, which is shown in FIG. 4 of the drawings. The shoulders 20 may also have chamfered edges 26, at opposite corners, which are preferably cut at a 45° angle and are preferably about 0.30 millimeters in length, which chamfered edges 26 facilitate the placement of the cover piece 24, or cap, over and onto the front wall 8 of the track 2.

The cover piece 24, or cap, is an elongated and generally U-shaped member (in transverse cross-section), and has a main segment 28 and opposite lateral latching legs 30 extending perpendicularly from opposite lateral sides of the main segment 28. The free ends of the lateral latching legs 30 of the cover piece 24 are turned inwardly, towards each other, to define inwardly extending flanges 32. Both the cover piece 24 and the track 2 (the elongated member 4) of this second embodiment of the present invention are also formed from a soft polyvinylchloride material or soft polyethylene material, and are preferably transparent, like the first embodiment of the track 2 shown in FIGS. 1 and 2 of the drawings. Thus, the lateral side walls 10 of the track 2 are resilient and deformable and may spread apart when an optical fiber is forced into the narrower entryway of the slot 12 formed in the front wall 8 of the track 2, and then close at least partially about the optical fiber to hold the optical fiber in place within the dovetail-shaped slot 12.

Once the optical fiber is inserted into the track 2, the cover piece 24 is mounted on the front wall 8 of the track 2, with its opposite lateral latching legs 30 engaging the shoulders 20 of the front wall 8 of the track 2 to secure the cover piece 24 to the track 2 and the optical fiber within the slot 12 of the track 2. Because the cover piece 24 is made from a relatively soft material and is resilient, the lateral latching legs 30 may expand to fit over the chamfered edges 26 and shoulders 20 of the track 2 and return to their normal position after the flanges 32 of the cover piece 24 pass over the shoulders 20 of the track 2 and engage the lips 22 thereof to secure the cover piece 24 to the track 2. The cover piece 24 may be removed by the technician or end user by simply pulling the cover piece 24 from the track 2 to disengage the latching legs 30 of the cover piece 24 from the shoulders 20 of the track 2. Furthermore, as with the first embodiment of the track 2 shown in FIGS. 1 and 2, an optical fiber placed in the slot 12 of this second embodiment of the track 2 shown in FIGS. 3 and 4 may be easily removed from the slot 12 by pulling the optical fiber upwardly through the slot 12.

The dimensions of the cover piece 24 are preferably as follows: the overall width of the main segment 28 of the cover piece 24 is about 5.90 millimeters; the length of each lateral latching leg 30 measured from the top surface of the main segment 28 of the cover piece 24 to the free end of each leg 30 is about 1.9 millimeters; the width of the flange 32 formed on the free end of each lateral latching leg 30 is about 0.35 millimeters; the space between the bottom surface of the main segment 28 of the cover piece 24 and the flange 32 is about 0.70 millimeters; and the thickness of the main segment 28 and each lateral latching leg 30 is about 0.60 millimeters.

Figure 2:
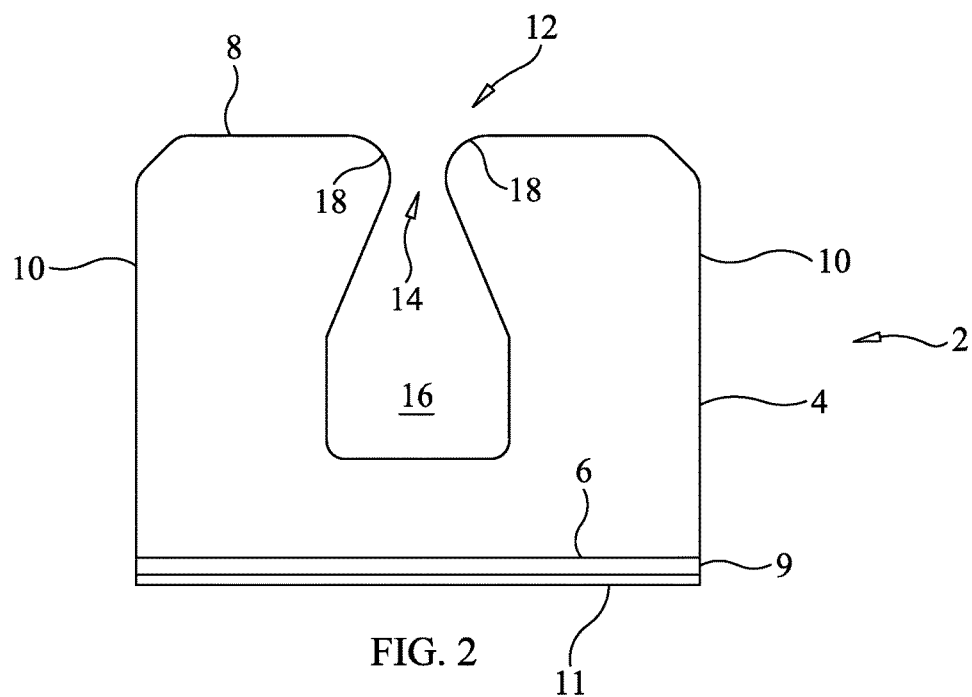
FIG. 2 is a transverse cross-sectional view of the track of the present invention shown in FIG. 1.
Figure 5:
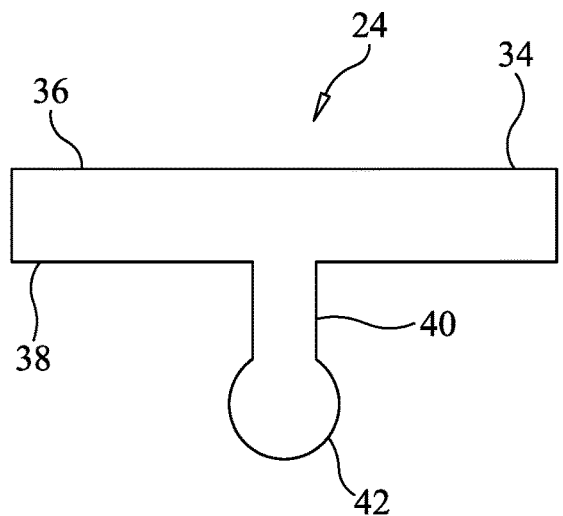
FIG. 5 is a transverse, cross-sectional view of another form of a cover piece forming part of the present invention for mounting on the track shown in FIGS. 1 and 2.

Another form of a cover piece 24, or cap, which may be used with the track 2 shown in FIGS. 1 and 2, or a similarly-shaped track, is shown in FIG. 5 of the drawings. The cover piece 24 of this embodiment is an elongated member that includes a planar main segment 34 having opposite top and bottom sides 36, 38, and a leg 40 extending outwardly and perpendicularly from the bottom side 38 of the planar main segment 34. The leg 40 has a free end of which is formed a bulbous or widthwise-enlarged member 42.

After the optical fiber is inserted into the inner cavity 16 of the slot 12 formed in the track 2, the cover piece 24 may be mounted on the track 2, with the enlarged member 42 of the leg 40 being forced through the narrower entryway 14 of the slot 12 until the planar main segment 34 of the cover piece 24 rests on the front wall 8 of the track 2. The cover piece 24 mounted thusly on the track 2 insures that the optical fiber will be held captive within the track slot 12.

The track 2 and optional cover pieces 24 may be formed using a continuous extrusion process. If formed from a flexible material, the track 2 and cover pieces 24 may be provided on a reel for simplified deployment. Alternatively, if formed from a semi rigid material, the track 2 and cover pieces 24 may be supplied in precut lengths, such as about 32 inches in length.

FIGS. 6-9 illustrate another version of a track 2 and cover piece 24 formed in accordance with the present invention. In this embodiment, the track 2 is also formed as an elongated member 4. The track 2 includes a base 47 having a back wall 6, a front wall 8 situated opposite the back wall 6, and opposite lateral side walls 10. The front wall 8 is also split along the longitudinal length of the track 2 so as to form a slot 12, and has beveled edges 18 at the entryway 14 to the slot 12 and at the surface of the front wall 8 of the track 2. In this embodiment, the slot 12 is formed with a U-shaped bottom in transverse cross-section where it defines a channel or cavity 16 in which an optical fiber may reside. Thus, the slot 12 formed in the front wall 8 of the track 2 defines the track with a pair of spaced apart legs 49 which extend generally perpendicularly outwardly from the base 47 along the length of the elongated track 2.

Figure 6:
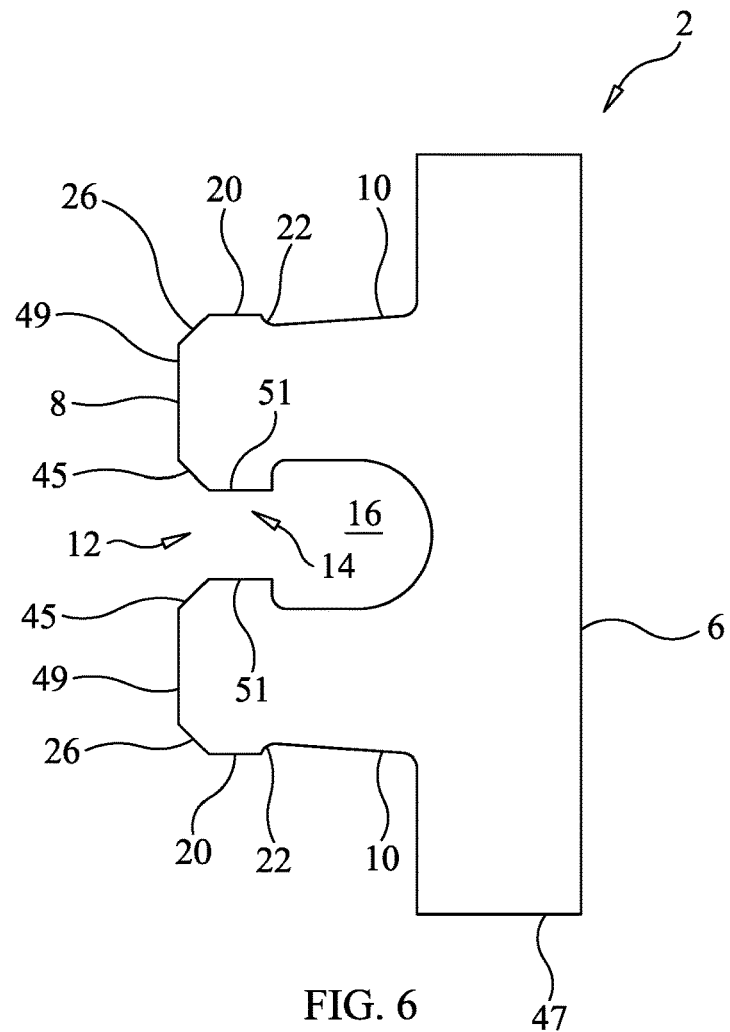
FIG. 6 is a transverse, cross-sectional view of a third embodiment of a track for routing an optical fiber and formed in accordance with the present invention.
Figure 7:
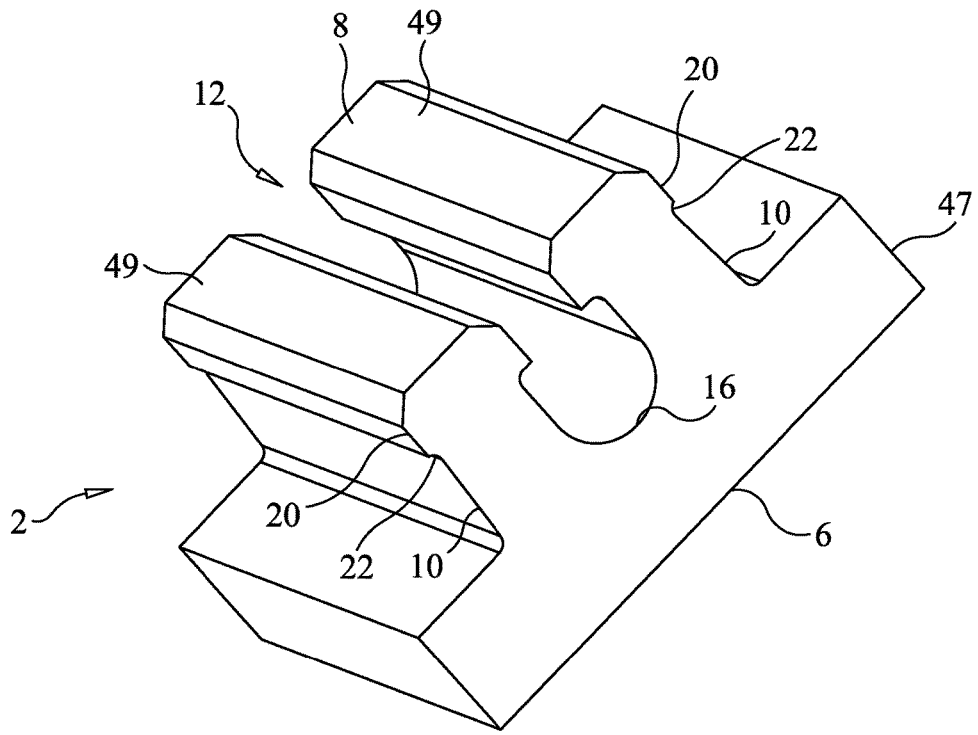
FIG. 7 is an isometric view of a section of a track for routing an optical fiber formed in accordance with the present invention and shown in transverse cross-section in FIG. 6.
Figure 8:
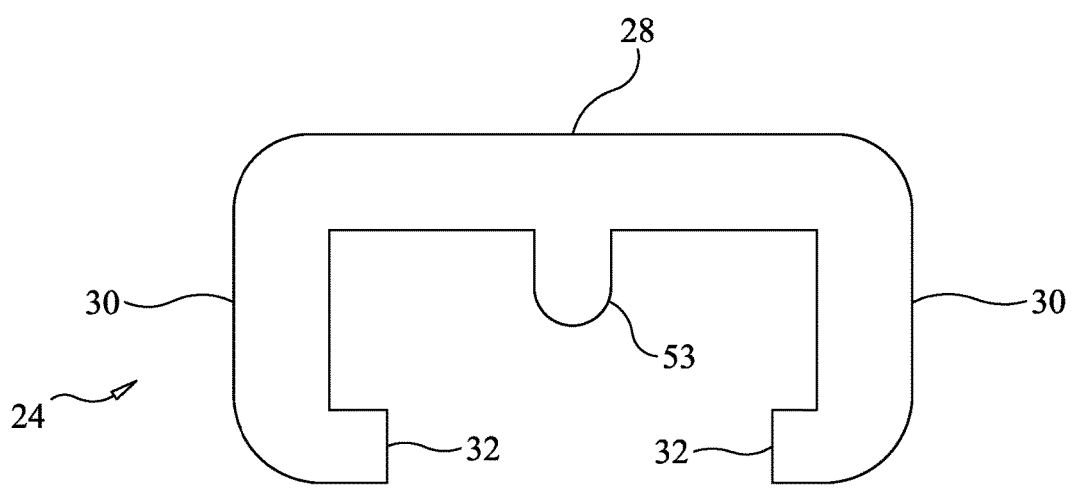
FIG. 8 is a transverse, cross-sectional view of yet another form of a cover piece forming part of the present invention for mounting on the track shown in FIGS. 6 and 7.
Figure 9:
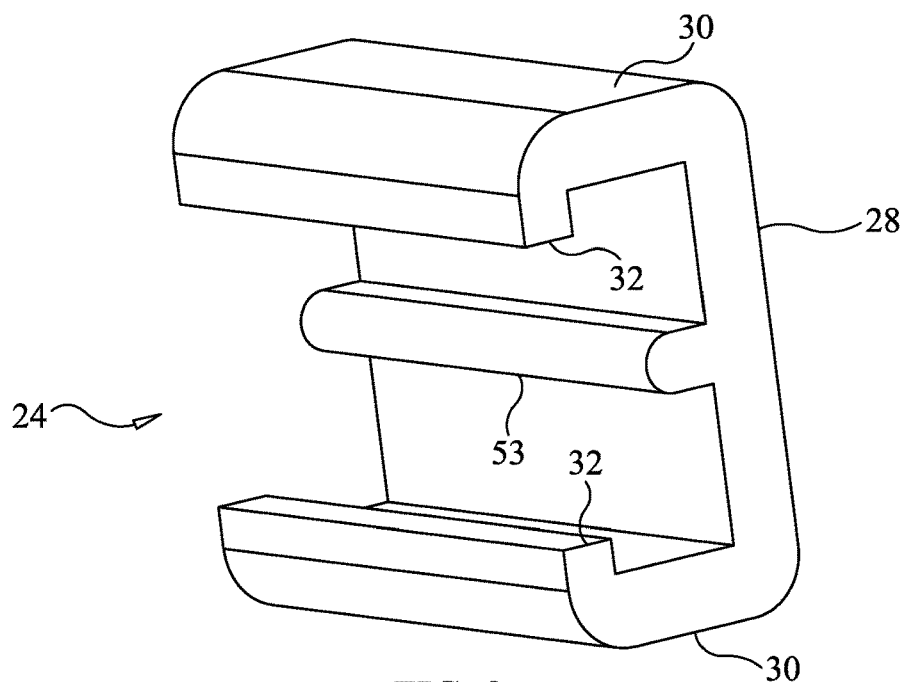
FIG. 9 is an isometric view of a section of a cover piece forming part of the present invention and which is shown in transverse cross-section in FIG. 8.

In the embodiment of the track 2 of the present invention shown in FIGS. 6 and 7 of the drawings, it can be seen that the front wall 8 includes opposite shoulders 20 which overhang in opposite directions the lateral side walls 10 of the track 2. Each shoulder 20 defines a lip 22 for securing over the front wall 8 of the track an elongated cover piece 24, or cap, which is shown in FIGS. 8 and 9 of the drawings. The shoulders 20 may also have chamfered edges 26, at opposite corners, which are preferably cut at a 45 degree angle, which chamfered edges 26 facilitate the placement of the cover piece 24, or cap, over and onto the front wall 8 of the track 2. The legs 49 may also include shoulders 51 which face each other and extend partially into the slot 12, thereby defining the slot 12 with a narrower width than that of the channel or cavity 16 in order to help retain an optical fiber within the channel 16 and to minimize the chance that the optical fiber will become inadvertently dislodged from the track 2 through the reduced width of the slot 12. The entryway 14 of the slot 12 at the front wall 8 of the track 2 may also include chamfered edges 45 to also facilitate the placement of the cover piece 24, or cap, over and onto the front wall 8 of the track 2, as will be described in greater detail.

The cover piece 24, or cap, shown in FIGS. 8 and 9 is particularly suited for use with the track 2 shown in FIGS. 6 and 7. The cover piece 24, or cap, is an elongated and generally U-shaped member (in transverse cross-section), and has a main segment 28 and opposite lateral latching legs 30 extending perpendicularly from opposite lateral sides of the main segment 28. The free ends of the lateral latching legs 30 of the cover piece 24 are turned inwardly, towards each other, to define inwardly extending flanges 32. Both the cover piece 24 and the track 2 (the elongated member 4) of this third embodiment of the present invention are also formed from a soft polyvinylchloride material or soft polyethylene material, and are preferably transparent, like the first and second embodiments of the track 2 shown in FIGS. 1-5 of the drawings. Thus, the lateral side walls 10 of the track 2 (i.e., the legs 49) are resilient and deformable and may spread apart when an optical fiber is forced into the narrower entryway of the slot 12 formed in the front wall 8 of the track 2, and then close at least partially about the optical fiber to hold the optical fiber in place within the channel or cavity 16 of the slot 12.

Once the optical fiber is inserted into the track 2, the cover piece 24 is mounted on the front wall 8 of the track 2, with its opposite lateral latching legs 30 engaging the shoulders 20 of the front wall 8 of the track 2 to secure the cover piece 24 to the track 2 and the optical fiber within the slot 12 of the track 2. Because the cover piece 24 is made from a relatively soft material and is resilient, the lateral latching legs 30 may expand to fit over the chamfered edges 26 and shoulders 20 of the track 2 and return to their normal position after the flanges 32 of the cover piece 24 pass over the shoulders 20 of the track 2 and engage the lips 22 thereof to secure the cover piece 24 to the track 2. The cover piece 24 may be removed by the technician or end user by simply pulling the cover piece 24 from the track 2 to disengage the latching legs 30 of the cover piece 24 from the shoulders 20 of the track 2. Furthermore, as with the first and second embodiments of the track 2 shown in FIGS. 1-5, an optical fiber placed in the slot 12 of this third embodiment of the track 2 shown in FIGS. 6-9 may be easily removed from the slot 12 by pulling the optical fiber upwardly through the slot 12.

The cover piece 24 may include a leg or projecting member 53 extending downwardly from the main segment 28 in a direction towards the facing inwardly extending flanges 32 of the latching legs 30. The projecting member 53 is receivable by the slot 12 when the cover piece 24 is mounted on the track 2. Projecting member 53 is provided to essentially close the slot 12 in the track 2 and to further ensure that the optical fiber within the channel or cavity 16 of the track 2 will not become dislodged inadvertently from the track 2.

The preferred dimensions of the track 2 shown in FIGS. 6 and 7 are as follows:

The base 47 is preferably about 5.18 millimeters in width measured along the back wall 6 thereof; the thickness of the base 47 is about 1.12 millimeters; the height to which the legs 49, measured at the front wall 8 of the track 2, extend from the back wall 6 of the base 47 is about 2.74 millimeters; the lower extent of each shoulder 20 measured from the lip 22 to the back wall 6 of the base 47 is about 2.18 millimeters; the width of the slot 12 is about 0.61 millimeters; the width of the cavity or channel 16 is about 1.02 millimeters; the distance between the outer surface of the shoulder 20 of one leg 49 to the outer surface of the shoulder 20 of the other leg 49 is about 3.00 millimeters; the distance which the side walls 10 of the legs 49 are inset from the outermost lateral surfaces of the base 47 is about 1.10 millimeters; and the radius of the curvature of the cavity or channel 16 is about 0.51 millimeters.

The preferred dimensions of the cover piece 24 shown in FIGS. 8 and 9 of the drawings are as follows:

The overall width of the cover piece 24 is about 4.50 millimeters; the overall depth of the cover piece 24 is about 2.31 millimeters; the spacing between the facing flanges 32 of the lateral latching legs 30 is about 2.55 millimeters; the width or thickness of each leg 30 is about 0.635 or about 0.64 millimeters; the thickness of the main segment 28 is about 0.64 millimeters; the distance which the projecting member 53 extends outwardly from the underside surface of the main segment 28 is about 0.64 millimeters; the width of the projecting member 53 is about 0.51 millimeters; the spacing between the underside surface of the main segment 28 and the upper or inner edge surface of the flanges 32 of the lateral latching legs 30 is about 1.19 millimeters; the width or thickness of each flange 32 is about 0.48 millimeters; the radius of the curvature of the outer surface of each lateral latching leg 30 where it is joined to the flange 32 is about 0.58 millimeters; and the radius of the curvature of the outer surface of the main segment 28 where it joins each leg 30 is about 0.51 millimeters.

Like the other tracks 2 and cover pieces 24 described previously herein, the track 2 and cover piece 24 shown in FIGS. 6-9 may be formed using a continuous extrusion process and, if formed from a flexible material, the track 2 and cover piece 24 may be provided on a reel for simplified deployment or may be supplied in precut lengths if, for example, they are formed from a semi-ridged material. The track 2 shown in FIGS. 6 and 7 of the drawings may also have an adhesive layer, such as layer 9 shown in FIG. 2, situated on the outer surface of the back wall 6 of the base 47, covered by a removable plastic backing, such as backing 11 also shown in FIG. 2.

Figure 10:
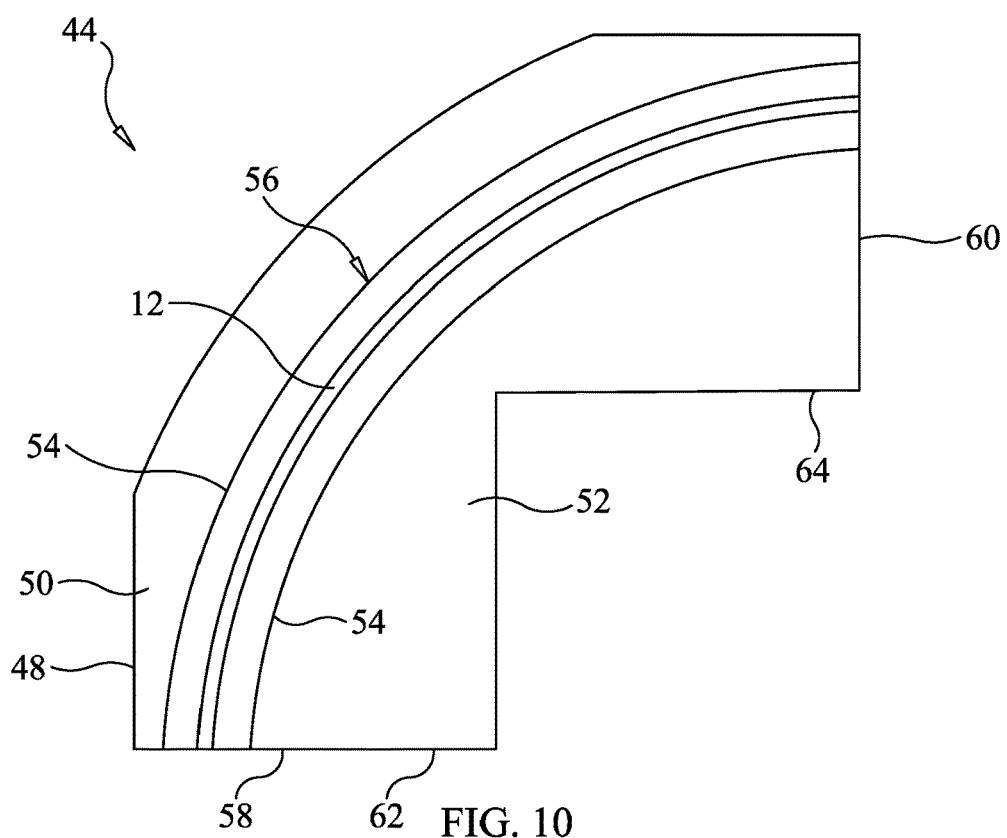
FIG. 10 is a front view of a corner piece forming one component of a track system for routing an optical fiber and formed in accordance with the present invention, the corner piece being configured to route the optical fiber around a corner of a door or window at or above the minimum bend radius required for optical fibers.
Figure 11:
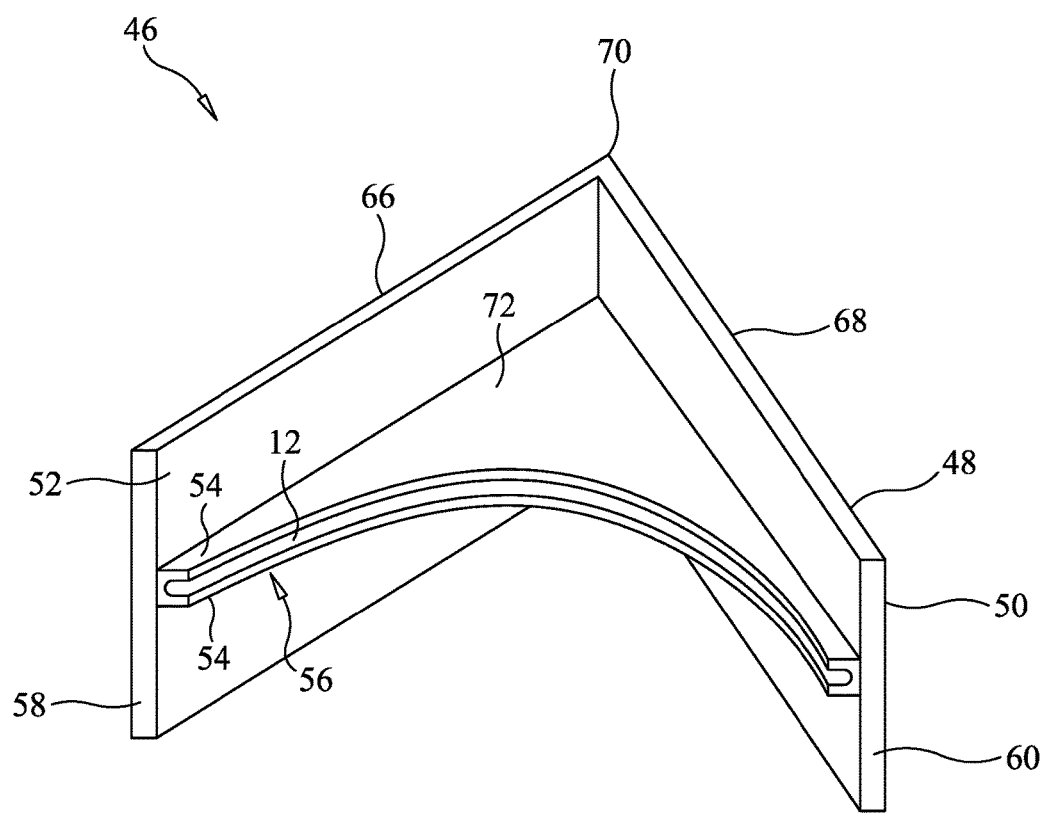
FIG. 11 is an isometric view of a corner piece forming one component of a track system for routing an optical fiber and formed in accordance with the present invention, the corner piece being configured to route the optical fiber around a corner of two adjoining walls at or above the minimum bend radius required for optical fibers.

FIGS. 10 and 11 illustrate corner pieces 44, 46 which may be used in conjunction with the tracks 2 shown in FIGS. 1-9. Thus, the tracks 2 (and cover pieces 24 shown in FIGS. 4, 5, 8 and 9) and corner pieces 44, 46 form components of a track system constructed in accordance with the present invention used for routing an optical fiber within the interior space of a residential or commercial premises. The corner pieces 44, 46 is formed with a planar supporting base plate 48 having a back wall 50 on which an adhesive layer, like layer 9, is situated, covered by a removable protective covering, like covering 11, and an opposite front wall 52. Extending perpendicularly outwardly from the front wall 52 of the supporting base plate 48 are two upstanding, spaced apart, curved legs or walls 54 which define a track 56, just like the tracks 2 shown in FIGS. 1-4, 6 and 7 of the drawings, with a slot 12 formed between them to receive an optical fiber. The upstanding walls 54, defining the track 56 for receiving the optical fiber, are curved at a predetermined radius which does not fall below the minimum bend radius required for optical fibers, exaggerated herein for illustration purposes. The upstanding walls 54 extend to first and second edges 58, 60 of the supporting base plate 48 which are preferably situated perpendicularly to each other. Thus, the tracks 2 shown in FIGS. 1-9 may be positioned to abut against opposite free ends of the upstanding walls 54 situated at the right angle edges 58, 60 of the corner piece 44, 46 to define a continuous track with that of the corner piece 44, 46 for receiving an optical fiber therein.

FIG. 10 shows a corner piece 44 formed in accordance with the present invention in which the upstanding walls 54 defining the slot 12 and track 56 through the corner piece 44 are of a constant height above the top surface of the supporting base plate 48. In this embodiment, the supporting base plate 48 may be formed with two coplanar sections 62, 64 joined together at a right angle or, if necessary, some other angle. This corner piece 44 may be used to route optical fibers around the corner of a door trim or window frame.

FIG. 11 shows a version of the corner piece 46 in which the supporting base plate 48 is formed with two, non-coplanar but perpendicularly disposed sections 66, 68. The upstanding, parallel walls 54 defining the track 56 and slot 12 for receiving an optical fiber extend across both sections 66, 68, but the height above the front wall 52 of the base plate 48 on which the upstanding walls 54 are situated varies from being relatively low at opposite edges of the two sections 66, 68 of the supporting base plate 48 and relatively high at the right angle mid-corner 70 of the base plate 48 where the two sections 66, 68 are joined. Thus, the upstanding track walls 54 are situated on a raised portion 72 of the supporting base plate 48, with the slot 12 defined between the walls 54 having a preferred depth of that described previously with respect to the tracks 2 shown in FIGS. 1-9 of the drawings and with a curvature that does not fall below the minimum bend radius required for optical fibers. The height of the track 56 defined by the upstanding walls 54 on the corner piece 46 at the opposite edges of the two sections 66, 68 of the corner piece 46, including the thickness of the supporting base plate 48, is equal to the height of the tracks 2 described previously and shown in FIGS. 1-5 of the drawings, so as to form therewith a continuous track for receiving an optical fiber where two interior walls of the premises meet.

The corner pieces 44, 46 of the track system of the present invention may be formed from the same material as that of the tracks 2 shown in FIGS. 1-9 of the drawings and described previously, that is, a soft polyvinylchloride material or a soft polyethylene material, and are also preferably clear so as to blend in with the color of a wall on which they are mounted. The corner pieces 44, 46 may also be formed from a more rigid clear material such as a hard polyvinylchloride or polycarbonate material, or similar material.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. A track system for routing an optical fiber, which comprises:
    a track for retaining the optical fiber therein, the track including an elongated member having a back wall and a front wall situated opposite the back wall, the front wall having a slot formed therein for receiving an optical fiber;
    wherein the elongated member of the track has an internal channel formed therein, the internal channel being in communication with the slot and for receiving therein the optical fiber;
    wherein the channel of the elongated member of the track is formed with a dovetail shape in transverse cross-section; and
    wherein the dovetail shape is narrowest where it meets the slot and includes a pair of opposite straight sides which are not mutually parallel.

2. A track system as defined by claim 1, wherein the elongated member of the track is formed from a transparent or translucent material so that the color of a supporting surface on which the track is mounted may be at least partially seen through the thickness of the elongated member.

3. A track system as defined by claim 1, wherein the elongated member of the track includes an adhesive layer, the adhesive layer being situated on the back wall of the elongated member for mounting the track to a supporting surface.

4. A track system as defined by claim 3, wherein the elongated member of the track includes a removable protective backing, the removable protective backing being situated on the adhesive layer and being removable therefrom.

5. A track system for routing an optical fiber, which comprises:
    a track for retaining the optical fiber therein, the track including an elongated member having a back wall and a front wall situated opposite the back wall, the front wall having a slot formed therein for receiving an optical fiber; and
    a cover piece, the cover piece including an elongated member, the cover piece being mountable to the track to help secure the optical fiber to the track;
    wherein the elongated member of the cover piece includes a planar main segment having a top side and a bottom side disposed opposite the top side, and a leg extending outwardly from the bottom side of the planar main segment, the leg of the elongated member of the cover piece being at least partially receivable by the slot formed in the elongated member of the track to help retain the optical fiber to the track;
    wherein the leg of the elongated member of the cover piece includes a free end and an enlarged, bulbous and circular in cross-section member situated at the free end of the leg, the enlarged, circular in cross-section member being receivable by the slot formed in the elongated member of the track to help retain the optical fiber to the track; and
    wherein the elongated member of the track is formed from a transparent or translucent material so that the color of a supporting surface on which the track is mounted may be at least partially seen through the thickness of the elongated member.

6. A track system as defined by claim 5, wherein the elongated member of the track includes an adhesive layer, the adhesive layer being situated on the back wall of the elongated member for mounting the track to a supporting surface.

7. A track system as defined by claim 6, wherein the elongated member of the track includes a removable protective backing, the removable protective backing being situated on the adhesive layer and being removable therefrom.

8. A track system for routing an optical fiber, which comprises:
    a track for retaining the optical fiber therein, the track including an elongated member having a back wall and a front wall situated opposite the back wall, the front wall having a slot formed therein for receiving an optical fiber; and
    a corner piece, the corner piece including:
    a supporting base plate, the supporting base plate having a back wall and a front wall situated opposite the back wall, and a first lateral edge and a second lateral edge;
    at least one pair of spaced apart legs situated on the front wall and projecting outwardly therefrom, the at least one pair of spaced apart legs extending in a curvature on the front wall of the supporting base plate between the first lateral edge and the second lateral edge, the spaced apart legs of the at least one pair of spaced apart legs defining a slot therebetween for receiving the optical fiber therein;
    wherein the supporting base plate includes a first planar section and a second planar section joined to the first planar section, the second planar section being non-coplanar with respect to the first planar section and disposed at an angle thereto; and
    wherein the supporting base plate includes a raised portion situated on the front wall thereof and extending across the first planar section and the second planar section, the raised portion having an outer edge, the at least one pair of spaced apart legs being situated on the outer edge of the raised portion of the supporting base plate.

9. A track system as defined by claim 8, wherein the first planar section of the supporting base plate is disposed at substantially a right angle to the second planar section of the supporting base plate.

10. A track system as defined by claim 8, wherein the corner piece is formed from a transparent or translucent material so that the color of a supporting surface on which the corner piece is mounted may be at least partially seen through the thickness of the corner piece.

11. A track system as defined by claim 8, wherein the corner piece includes an adhesive layer, the adhesive layer being situated on the back wall of the supporting base plate for mounting the corner piece to a supporting surface.

12. A track system as defined by claim 11, wherein the corner piece includes a removable protective backing, the removable protective backing being situated on the adhesive layer and being removable therefrom.

* * * * *